United States Patent
Masutti (10) Patent No.: US 9,789,411 B2
(45) Date of Patent: Oct. 17, 2017

(54) APPLIED LAYOUT IN VIRTUAL MOTION-ACCELERATION SPHERICAL SIMULATOR

(71) Applicant: Motion Sphere Desenvolvimento de Tecnologia E Loca, Curitiba (BR)

(72) Inventor: Jefferson Edwin Masutti, Curitiba (BR)

( * ) Notice: Subject to any disclaimer, the term of this patent is extended or adjusted under 35 U.S.C. 154(b) by 0 days.

(21) Appl. No.: 15/131,140

(22) Filed: Apr. 18, 2016

(65) Prior Publication Data
US 2016/0303484 A1  Oct. 20, 2016

(51) Int. Cl.
| | |
|---|---|
| *A63G 31/16* | (2006.01) |
| *G09B 9/00* | (2006.01) |
| *G09B 9/05* | (2006.01) |
| *G09B 9/06* | (2006.01) |
| *G09B 9/10* | (2006.01) |
| *G09B 9/12* | (2006.01) |

(52) U.S. Cl.
CPC .............. *A63G 31/16* (2013.01); *G09B 9/00* (2013.01); *G09B 9/05* (2013.01); *G09B 9/063* (2013.01); *G09B 9/10* (2013.01); *G09B 9/12* (2013.01)

(58) Field of Classification Search
CPC ........ A63G 31/00; A63G 31/12; A63G 31/16; G09B 9/00; G09B 9/14; A63F 13/00; A63F 13/245; A63F 13/28; A63F 13/803
USPC ............ 472/47, 59, 60, 61, 130; 434/29, 55, 434/34–35, 37
See application file for complete search history.

(56) References Cited

U.S. PATENT DOCUMENTS

| | | | |
|---|---|---|---|
| 1,896,175 A * | 2/1933 | Huffman | G09B 9/14 434/56 |
| 2,046,202 A | 6/1936 | Herbert | |
| 3,295,224 A | 1/1967 | Cappel | |
| 4,464,117 A | 8/1984 | Foerst | |
| 4,824,099 A * | 4/1989 | Rusu | A63G 31/00 434/55 |
| 4,856,771 A * | 8/1989 | Nelson | A63G 31/16 434/34 |
| 5,060,932 A | 10/1991 | Yamaguchi | |
| 5,372,505 A | 12/1994 | Smith | |
| 5,490,784 A * | 2/1996 | Carmein | A63B 22/02 434/29 |
| 5,702,784 A * | 12/1997 | Nishimura | B29C 47/0026 428/34.9 |
| 5,725,435 A | 3/1998 | DeCastro | |
| 6,131,436 A | 10/2000 | O'bannon | |
| 6,533,670 B1 * | 3/2003 | Drobnis | A63G 31/16 434/55 |

(Continued)

*Primary Examiner* — Kien Nguyen
(74) *Attorney, Agent, or Firm* — Mark Levy; Hinman, Howard & Kattell, LLP (57) ABSTRACT

A virtual motion-acceleration spherical simulator includes an outer gyroscopic sphere, an inner gyroscopic sphere concentrically disposed relative to the outer gyroscopic sphere, and a spherical cockpit having eight quadrants. The cockpit has a display device, a full HD 3D projector, a curved screen simulating a windshield, a controller device, and a real vehicle dashboard. A first seat is provided for an operator in a first quadrant of the spherical cockpit and a second seat is provided for a navigator in a second quadrant of the spherical cockpit. Drive assemblies connected to the gyroscopic spheres impart longitudinal and lateral movement in two orthogonal directions.

7 Claims, 10 Drawing Sheets

(56) References Cited

U.S. PATENT DOCUMENTS 7,559,766 B2\* 7/2009 Epley .................. A61B 5/4863
                                                                      434/34
2012/0083347 A1 4/2012 Trui et al.

\* cited by examiner

APPLIED LAYOUT IN VIRTUAL MOTION-ACCELERATION SPHERICAL SIMULATOR

FIELD OF THE INVENTION

The present invention relates to simulators for education, training, gaming, amusement, and leisure purposes and, more particularly, to virtual motion-acceleration spherical devices for use in such simulators.

BACKGROUND OF THE INVENTION

Airplane pilots, automobile racers, enthusiasts, and "garners" have found that simulation systems can provide a safe way to experience situations and can develop or improve certain driving skills, for example, in drifting, hitting brakes, on wet tracks, in different terrains, with loss of control, rollovers, and collisions and can improve reflexes while driving.

Such simulations are required for drivers, driving schools, and for simple entertainment. Thus it is necessary to provide affordable mechanisms for training centers, driving schools, and even companies in entertainment, arcades, or parks.

Controllers (steering wheels, joysticks, and other customized input devices for games), 3D displays, and acceleration simulators are prevalent among electronic devices and games. The industry of motion-acceleration simulators is growing fast, but their high cost forces enthusiasts to create their own "home-made" simulators, which cannot compete with commercial systems.

Driving simulators have their origin in flight simulators where the forerunners in the virtual reality of the industry created the first motion simulator 3-axis (rotation in x, y, and z displacement) and without audiovisual devices simply to instruct their students with sensations similar to actual flights.

A range of motion-acceleration simulators was created and used in World War II, but only in the 60s were computers used with audio-visuals for the motion experience.

Only in the 80s did automobile simulators begin to enter the market with the development of the HYSIM (Highway Driving Simulator), a fixed base simulator that served to improve the perception of traffic control devices.

From that time on, evolution continued and the models of today are plentiful. They can be classified in two categories: the freedom graded-level, and the operator position in terms of motion-driven axes.

Simulator models include: fixed base simulators; vibration-based; rotables; trays; robotic cages; and spherical simulators.

DISCUSSION OF RELATED ART

One of the first fixed base simulators to be developed is described in U.S. Pat. No. 2,046,202, issued Jun. 30, 1936 to Miles, entitled OPTICAL PROJECTION APPARATUS. Fixed-based simulators are motion-free equipment and are limited only to audio-visual experiences as well as the sensation of direction by environment immersion, without acceleration.

There are simulators with actuator devices of eccentric rotation or other forms of device capable of generating vibration frequencies and intensity variables simulating difficult terrain, light impacts, or even vibrations of the engine. These are systems usually very simple with a low level of immersion simulating only a small portion of environmental variables. An example is described in U.S. Pat. No. 5,372,505, issued Dec. 13, 1994 to Smith, entitled VEHICLE SIMULATOR.

Vibration motion simulators use three axes of space, using the operator's rotation on the axis itself. That is, the rotation axis is below the seat. Thus, the simulation of the acceleration is performed by tilting the operator in the desired direction. It is certainly the cheapest acceleration simulation method, but it lacks short duration accelerations. Because the displacement is required to generate the desired acceleration causes, the operator is accelerated in the opposite direction. For instance, an example is described in U.S. Pat. No. 4,464,117, issued Aug. 7, 1984 to Foerst, entitled DRIVING SIMULATOR APPARATUS.

Tray simulators have three axes of space in which the operator sits on a sliding tray. This is a high fidelity performance simulation model. Since there is no movement, the tray simulator does not simulate; it merely allows displacement and rotation in x, y, or z directions.

A tray simulator can be one of the following structured profiles:

Stewart's platform—hexapod support system enabling displacement and rotation in three axes by hydraulic or pneumatic pistons, or electromechanical fixed, prism-shaped actuators. The world's best simulators still operate with such a system; and Robot crane—a tray system where the support is made via cables (the system hangs) instead of pistons. It allows smaller accelerations to be connected to the platform by weight during the descent, but with greatly reduced cost.

A template from a tray simulator is described in U.S. Pat. No. 3,295,224, issued Jan. 3, 1967 to Cappel, entitled MOTION SIMULATOR.

Robot simulators have a full motion in all directions with great speed and motion range. These devices are typically used for the simulation of extreme acceleration and endurance tests for fighter pilots and astronauts. It is a cage attached to the gripper of a 6-axis robot with a program that analyzes the current position instead of seeking the desired position and generates a trajectory to simulate acceleration which can reverse the cage to get the desired acceleration even when it is stroke limited from the robotic structured frame. Projected trays tend to be cheaper projects, but with a much more complex implementation. An example is described in U.S. Pat. No. 6,131,436, issued Oct. 17, 2000 to O'Bannon, et al., entitled METHOD AND SYSTEM FOR WEAR TESTING A SEAT BY SIMULATING HUMAN SEATING ACTIVITY AND HUMAN BODY SIMULATOR FOR ROBOTIC USE THEREIN.

Spherical simulators generally have three rotation axes, which enable rotary movements in any direction. Such spherical simulators are described in:

U.S. Pat. No. 5,725,435, issued Mar. 10, 1998 to De Castro Faria, entitled ELECTRO-MECHANICAL AMUSEMENT SIMULATOR WITH GRAVITATIONAL EFFECTS. A central circular base supports an arc with lateral engines. A central ring is provided with a sphere of transparent material and a chair is symmetrically centered. The arc rotates laterally relative to the central ring and the central ring rotates in rotary motion clockwise and counter clockwise;

United States Published Patent Application No. 2012/0083347, published Apr. 5, 2012 to Trui, et al., is entitled SPACE ORIENTATING MECHANISM WITH TWO TETRAHEDRONS AND EIGHT ARC-LINKS. A series of semi intertwined arches is provided, as are gears with motors, which enable the implementation of several rotating movements. The structure of the machine is extremely complex and expensive, making it practically cost prohibitive to construct;

U.S. Pat. No. 5,060,932, issued Oct. 29, 1991 to Yamaguchi, entitled AMUSEMENT APPARATUS HAVING ROTARY CAPSULE, describes a fun machine with rotating capsule, which is driven by motors with bevel gear drive rings.

In such models, the positioning of the occupant is along the vertical axis and between the horizontal axis. The operator is positioned across the quadrants (the upper body part stands in central line of the sphere and the lower body part, below such line), so the head shakes to one side while the body moves to the other, causing disorientation in the occupants, dizziness, nausea, and other conditions.

The present invention, however, differs completely from fixed base, vibration, rotables, tray, and robotic cage simulators. A main difference and advantage over conventional spherical simulators is in the position of the occupants (operator and navigator), positioned within individual quadrants. That is, each user occupies only one of the eight quadrants of the sphere. The inventive system provides acceleration for the whole body to the same side so the operator feels the same sensations of driving in a real race without causing nausea or distemper.

SUMMARY OF THE INVENTION

The present invention relates to simulators for education, training, gaming, amusement, and leisure purposes, in which players may control land, aquatic, and air vehicles, The operator and navigator are positioned in single quadrants, which means each person takes one seat from the eight quadrants of the sphere. Another innovative feature of the invention is the use of one sphere and reduction pulleys, utilized with belts which cover the entire diameter of two rims that include the sphere and a geared motor for each axis. A very large and powerful engine is not required to perform the movements.

Aside from the given features profile, this gear is driven to a high level of disconnection between the average simulator player and the real world, emerging to sensations inherent to the game itself such as 3D audio-visual effects, rumble pack effects, dynamic ventilation adjusted by the speed, force-feedback to steer, real environment for the cockpit equipped with real instrument dashboard simulating speed information and engine rotation. A vehicle dashboard, full footswitch, H-designed profile gear box, motor sport bucket seats with 4-point safety buckles, and the lateral and longitudinal sided sensation of motion-acceleration of the vehicle during the race, are all provided inside a sphere enabling the sensation of a real life pilot without being exposed to actual risks inherent in real life operation.

The game type is freely chosen by the operator, provided that it operates on a PC, since the system uses the internal variable game set in order to generate respective simulations in the real life world, according to each player's movement. Four micro-controlled devices operate in-sync with distributed processing, controlling the various simulations and maintaining the device safely during the race.

In accordance with the present invention, there is provided a virtual motion-acceleration spherical simulator that includes an outer gyroscopic sphere, an inner gyroscopic sphere concentrically disposed relative to the outer gyroscopic sphere, and a spherical cockpit having eight quadrants. The cockpit has a display device, a full HD 3D projector, a curved screen simulating a windshield, a controller device, and a real vehicle dashboard. A first seat is provided for an operator in a first quadrant of the spherical cockpit and a second seat is provided for a navigator in a second quadrant of the spherical cockpit. Drive assemblies connected to the gyroscopic spheres impart longitudinal and lateral movement in two orthogonal directions.

BRIEF DESCRIPTION OF THE DRAWINGS

A complete understanding of the present invention may be obtained by reference to the accompanying drawing, when considered in conjunction with the subsequent detailed description, in which.

DETAILED DESCRIPTION OF THE PREFERRED EMBODIMENT

Although the following detailed description contains specific details for the purposes of illustration, those of ordinary skill in the art will appreciate that variations and alterations to the following details are within the scope of the invention. Accordingly, the exemplary embodiments of the invention described below are set forth without any loss of generality to, and without imposing limitations upon, the claimed invention.

The simulator consists of two concentric spheres which follow the principle of gyroscopes and printed operator acceleration, through its rotation, driven by a micro distributed control system that supervises the entire process. In addition to two gyroscopic spheres, the simulator has a spherical cockpit with eight quadrants. The cockpit has a display device, a full HD 3D projector, a curved screen simulating a windshield, a controller device, and a real vehicle dashboard. A first seat is provided for an operator in a first quadrant of the spherical cockpit and a second seat is provided for a navigator in a second quadrant of the spherical cockpit. Drive assemblies connected to the gyroscopic spheres impart movement in two orthogonal directions, longitudinal and lateral.

Referring now to FIGS. 1, 2, 3, and 7, a simulator for virtual games is shown and identified as reference numeral 1. A booth/spherical cockpit 1A is equipped with a display device formed by a full HD 3D projector D which displays the game image on a curved screen E simulating a windshield. Also provided in cockpit 1A are 3D kit glasses, a controller device including force feedback steering wheel, pedals, gear, hand brake, and auxiliary keyboard, and an audio device with sound system having 7.1 channels, in order to create an immersion over the realistic sound atmosphere.

A real vehicle dashboard 1B allows real-time monitoring of speed, RPM, and current gear, among other information and effects. Motor sport bucket seats include 4-point safety buckles 1C. Cameras and hoods are also provided, which vary the airflow according to the vehicle speed. The automobile dashboard with steering wheel, pedals, and gears may be replaced by panels and other controls that simulate other types of games such as aircraft, spacecraft, ships, etc.

Structural base profile H-beams 2 are formed by two lateral support columns, supported and rotated concentrically outside an outer, gyroscopic sphere 3 which surrounds and supports an inner, concentric, gyroscopic sphere 4 and spherical capsule 1A. An internal structure of the cabin/cockpit 1A is formed by a circular base 5 fastened onto the intersections of rims of inner concentric sphere 4. An operator A is positioned in one of the eight quadrants Q of the spherical cabin and a navigator B is positioned in a second quadrant Q1. In operation, both operator A and navigator B stay in a sitting position, leaving only part of their legs in respective front lower quadrants, since their heads are below or at the same level as the horizontal center rim, causing their entire bodies to move in the same direction.

Figure 8:
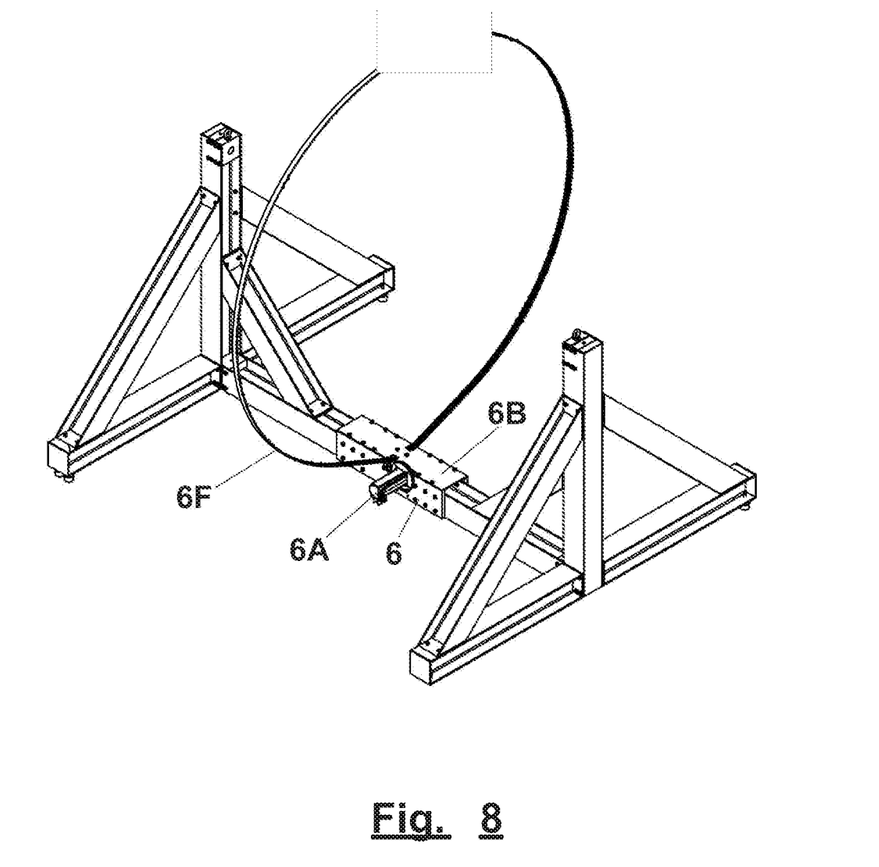
FIG. 8 is a perspective view of the support base and the rotating mechanism of the outer sphere which imparts longitudinal movement.
Figure 9:
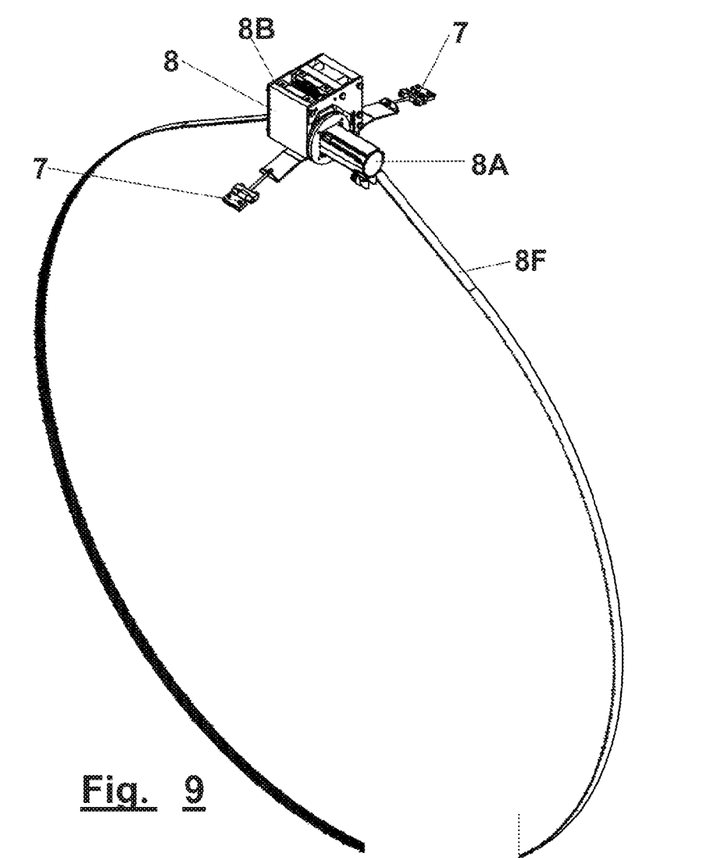
FIG. 9 is a perspective view of the inner spheric rotation mechanism which imparts movement orthogonal to the longitudinal movement shown in FIG. 8.
Figure 10:
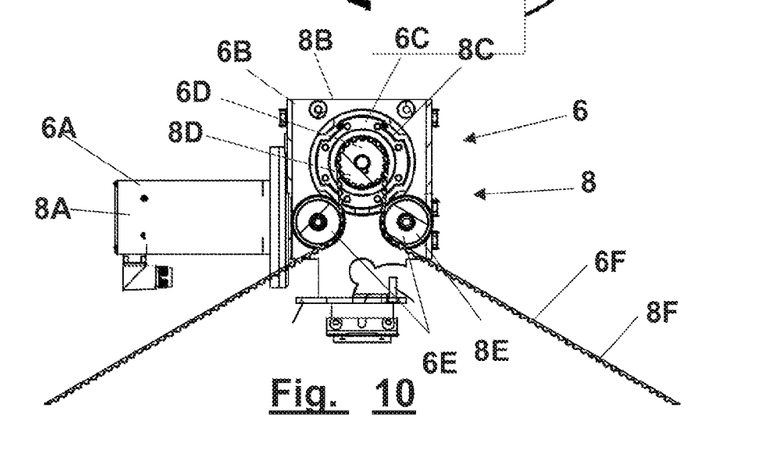
FIG. 10 is a front sectional view of the rotation mechanism.

Gyroscopic spheres have a first drive traction assembly 6 for gyroscopic sphere 3, which imparts longitudinal movement "Y", this assembly being formed by a motor 6A, which is coupled to a lower container 6B, providing internally a reduction gear unit 6C with a toothed pulley 6D coupled to the engine and two flat pulleys 6E. Pully 6D pierces and rotates a toothed belt 6F, which pulls vertical rim 3A of outer sphere 3, which functions as a large reduction pulley. Belt 6F is attached by its ends at the top of rim 3A via two turnbuckles 7, which are fixed in the upper housing 8B of second drive traction assembly 8 for internal gyroscopic sphere 4, which accomplishes the "X" lateral movement. This second drive traction assembly 8 is likewise equipped with an engine 8A, a reduction gear 8C with a toothed pulley 8D, and two flat pulleys 8E, whereby the toothed belt is tensioned 8F, surrounding vertical rim 4A of inner sphere 4 and also functions as a large reduction pulley.

The spherical cockpit 1A is caused to rotate by rotating the rings of spherical gyroscopic outer and inner concentric spheres 3, 4. Outer sphere 3 is used to rotate the directions of front and rear elevation and internal sphere 4 is used to rotate in lateral directions. The rims of the outer and inner spheres 3, 4 act as two large reduction pulleys, each engaged by a toothed belt, secured by the ends to two stretching devices, and rotated by two sets of drive, comprising a motor, a gear, and a pulley toothed traction assembly.

Immersion is more efficient when the operator A is not aware of the rumble conditions. Immersion takes place when spheres 3, 4 are closed and the smooth acceleration ramps to maintain an acceleration of up to 7 g, using the acceleration of the rotation to start the movement, impact and gravity itself to keep it for as long as necessary.

In order to provide a corresponding audio-visual experience, a 3D projector is provided to display a high definition curved image on a curved screen which covers more than 90% of the operator's field of view, while it is immersed in a 3D sound system with high definition Surround 7.1-channel. The simulator 1A also has a genuine and dynamic dashboard installed just below the screen which displays the vehicle speed, RPM, current gear, and other information and effects inherent to the vehicle.

The interaction with the simulation software is made with a controller, equipped with a steering wheel control position encoder and motor slave to generate feedback vibrations and forces equipped in the vehicle dashboard. Controller includes one pedal with clutch, brake, and accelerator, equipped in the platform just below the dashboard and a 6-speed shift reverse positional gear box located next to the bank.

For proper safety issues compliance, the system comprises a proper control operation of each of the cards dealt to each update cycle and a redundant emergency channel and positive action linked to each plate and a mushroom button-type field operator performance, which instantly cuts the channels between the drives and motor. Four-point safety buckles improve safety, since the system rapidly varies in the direction of acceleration and reaches 270 degrees of rotation.

USB conversion is performed using an FTDI-232 to convert USB controller to serial communication to send all control signals, since they are used for the I2C network. The serial signal must be sent to the main controller, which will separate the information for each axis and send signals to their respective parent companies through a second network, I2C.

Each parent, to receive and recognize an address, initializes an interrupt to the receipt of information and receives controls for its axis to position it in a new quota. All signals and inherent alerts to each axis must be controlled by its respective controllers as well.

When the sensory illusion of displacement and rotation through the four missing axes is reached, the existence of rotation and displacement on the z axis is apparent with greater intensity to realize the actual displacement or acceleration in x and y directions. This is due to the displacement of position of the operator about the sphere rotation center.

The displacement of the operator to bring the rotation of the outer shaft, when moving clockwise, results in a sense of displacement z+ while there is a sensation of braking of the vehicle; but when this displacement is small and in conjunction with rotation y, the feeling is equivalent merely to passing over a bump in the road.

Such displacement is real and interpolated with the rotation of the original shaft. Once this has taken place by the rotation axes of x and y, z axis acceleration data is inserted in the form of a modulated signal on the x and y command, and generates a sense of z.

Figure 1:
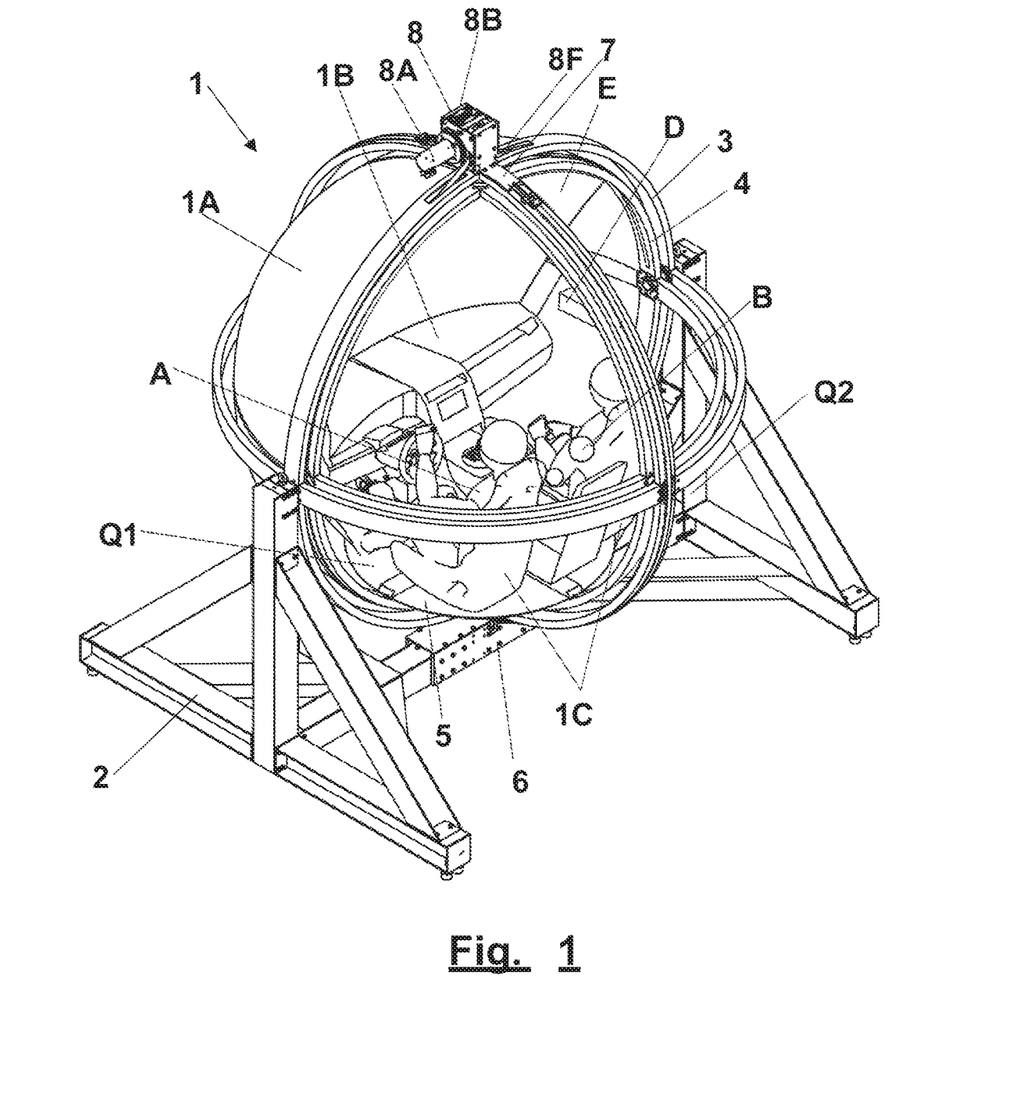
FIG. 1 is a perspective view of the inventive virtual motion-acceleration spherical simulator in the open layout.
Figure 2:
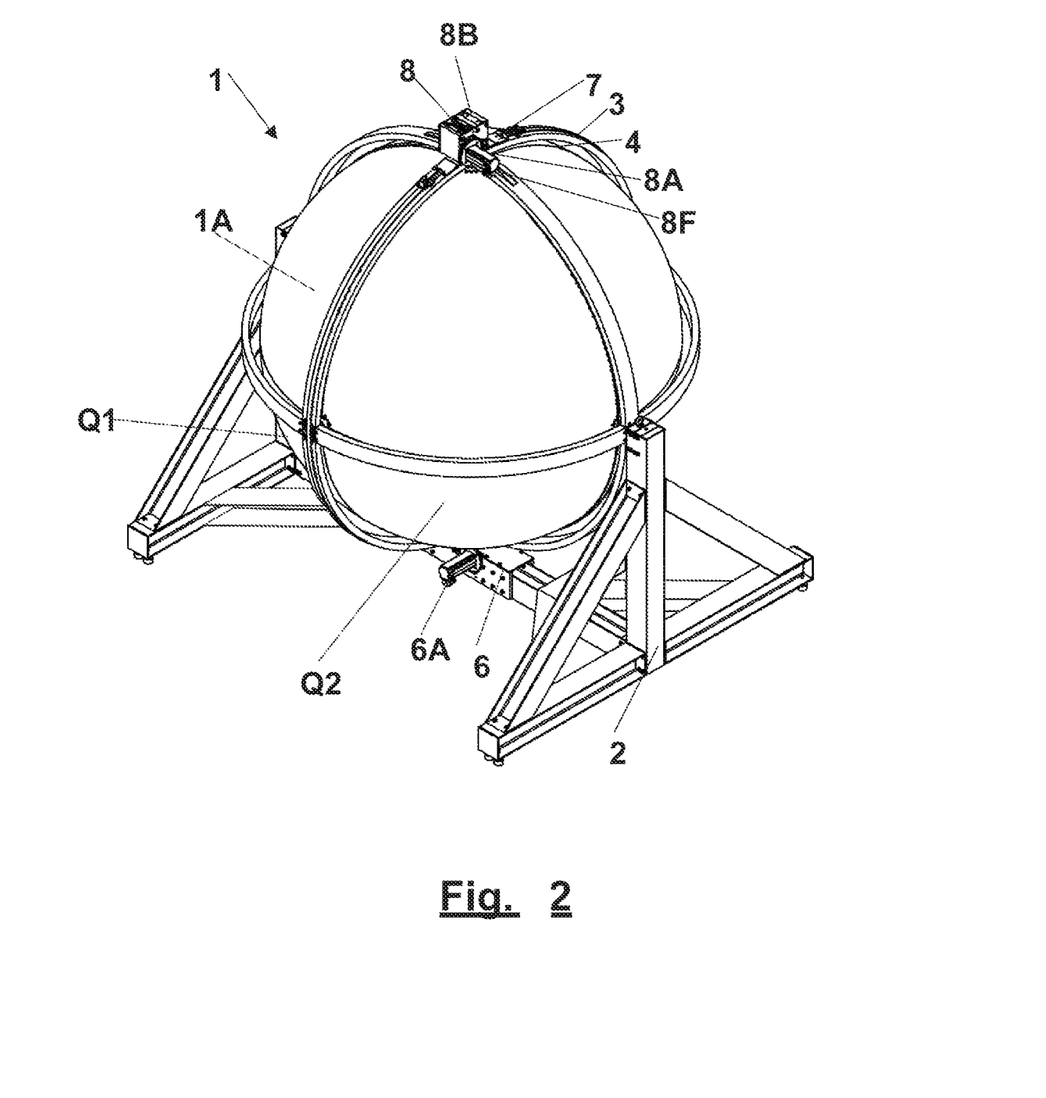
FIG. 2 is a perspective view of the virtual motion-acceleration spherical simulator of FIG. 1 in the closed layout.
Figure 3:
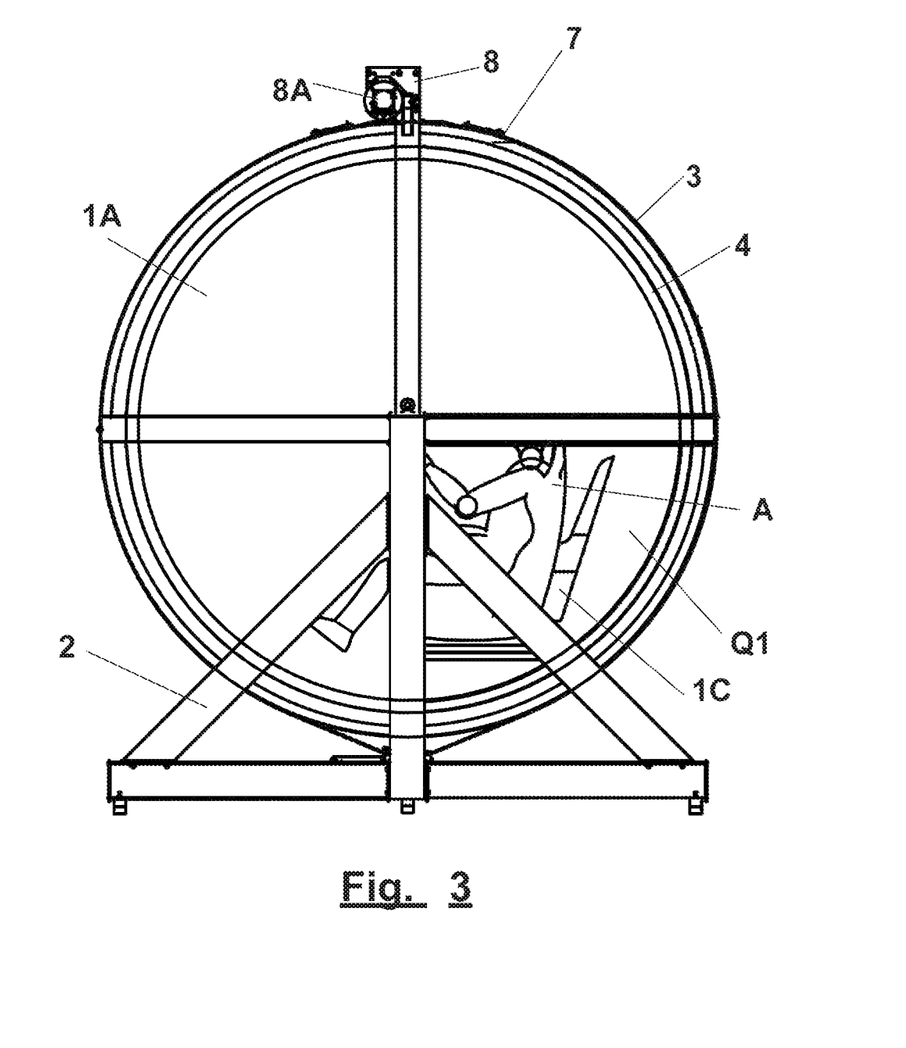
FIG. 3 is a side view of the applied layout in the virtual motion-acceleration spherical simulator.
Figure 4:
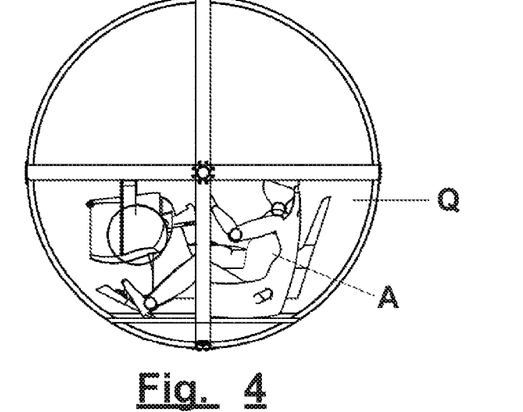
FIG. 4 is a schematic side view of the operator's position in the simulator.
Figure 5:
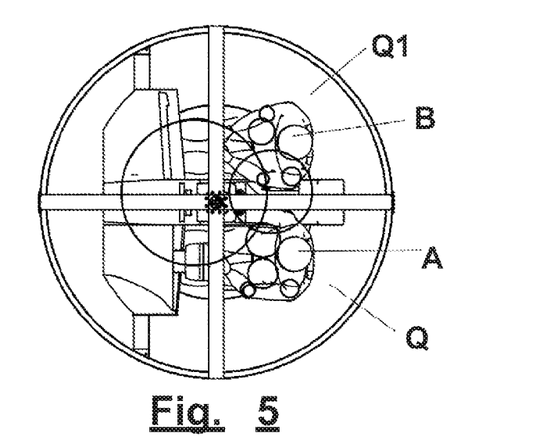
FIG. 5 is a schematic top view of the operator's and navigator's positions in the simulator.
Figure 6:
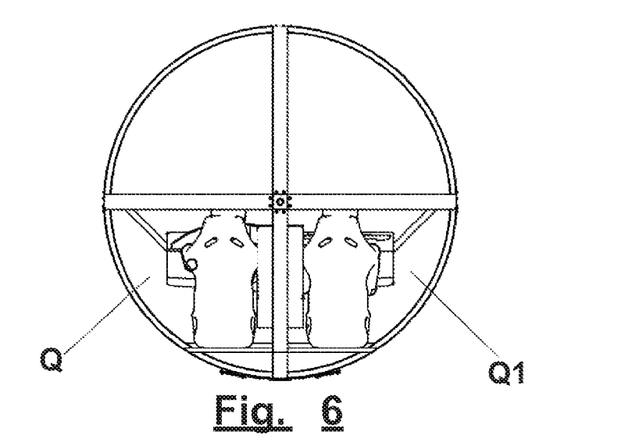
FIG. 6 is a schematic rear view of the operator's and navigator's positions in the simulator.
Figure 7:
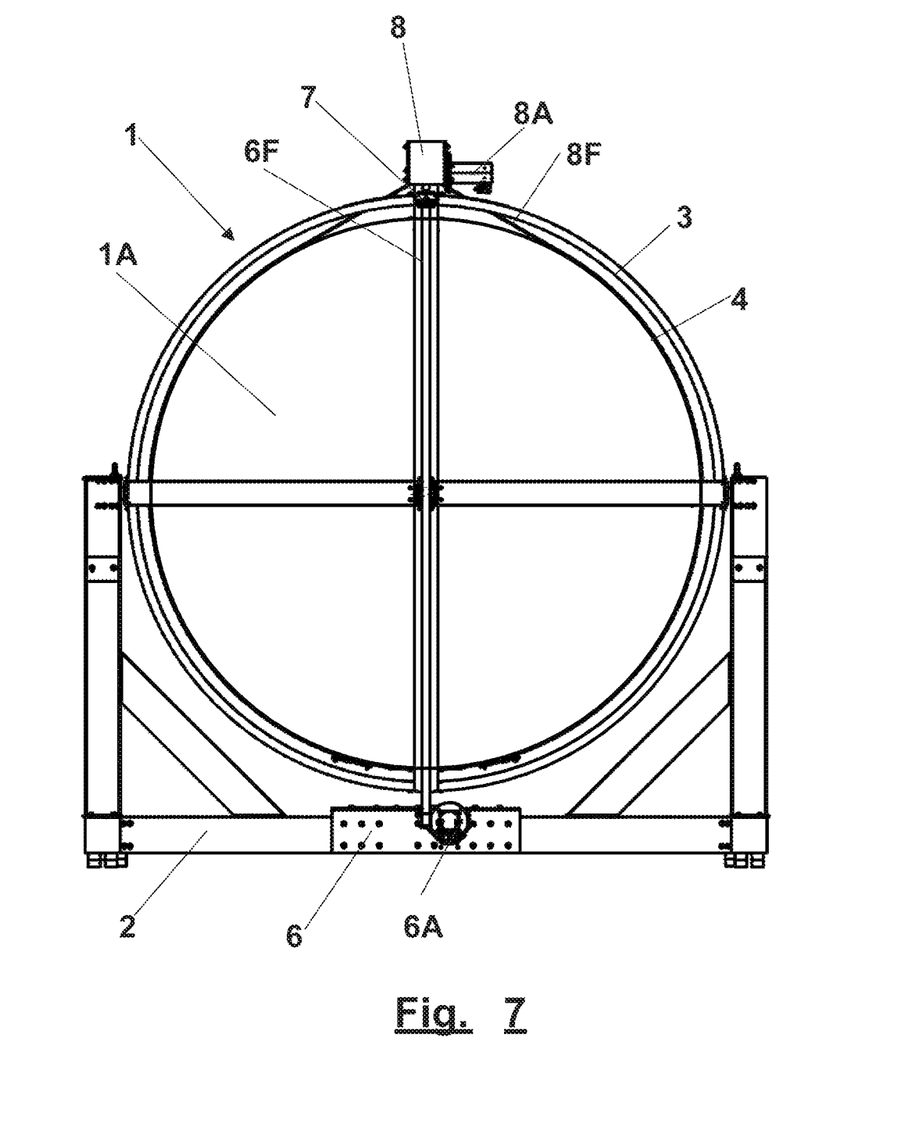
FIG. 7 is a front view of the virtual-motion acceleration spherical simulator.

In FIGS. 4, 5 and 6 there are shown the positions of operator A in the quadrant Q and navigator B in the quadrant Q1, two of the eight quadrants of the spherical cockpit, where only part of the operator's and navigator's legs and feet are in the lower front quadrant. Because of this position, the body of the occupants move entirely in the same direction. They have complete control over the spherical movements as if they were actually driving the vehicle.

FIGS. 8, 9 and 10 show sets of traction 6, 8, motor 6A,8A, lower casing 6B and upper casing 8B, reducers 6C, 8C with toothed pulleys 6D, 8D, and two flat pulleys 6E, 8E, toothed belts 6F, 8F and stiffeners 7.

Figure 11:
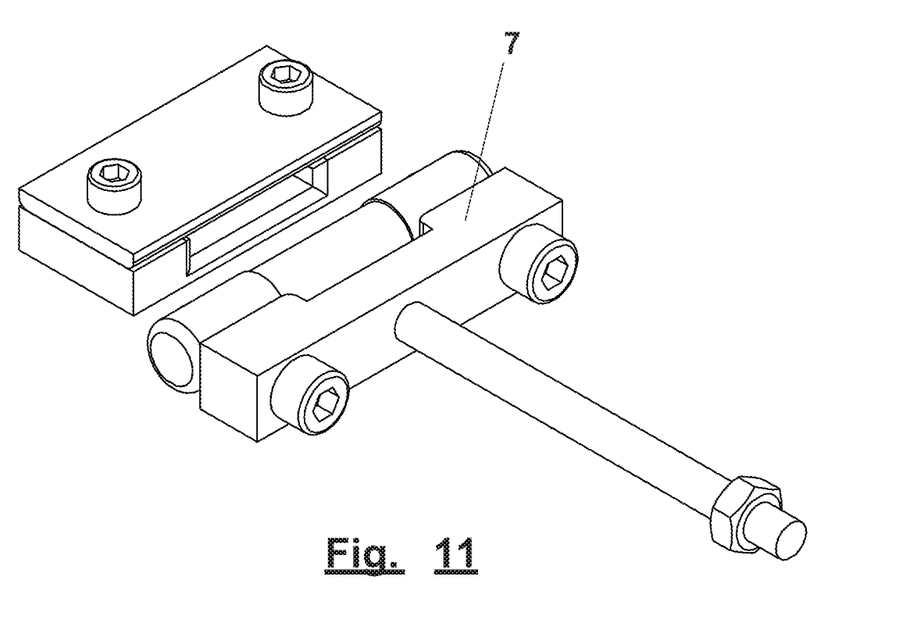
FIG. 11 is a perspective view of the tractor timing belt.

FIG. 11 shows one of the turnbuckles 7 of toothed belts.

Figure 12:
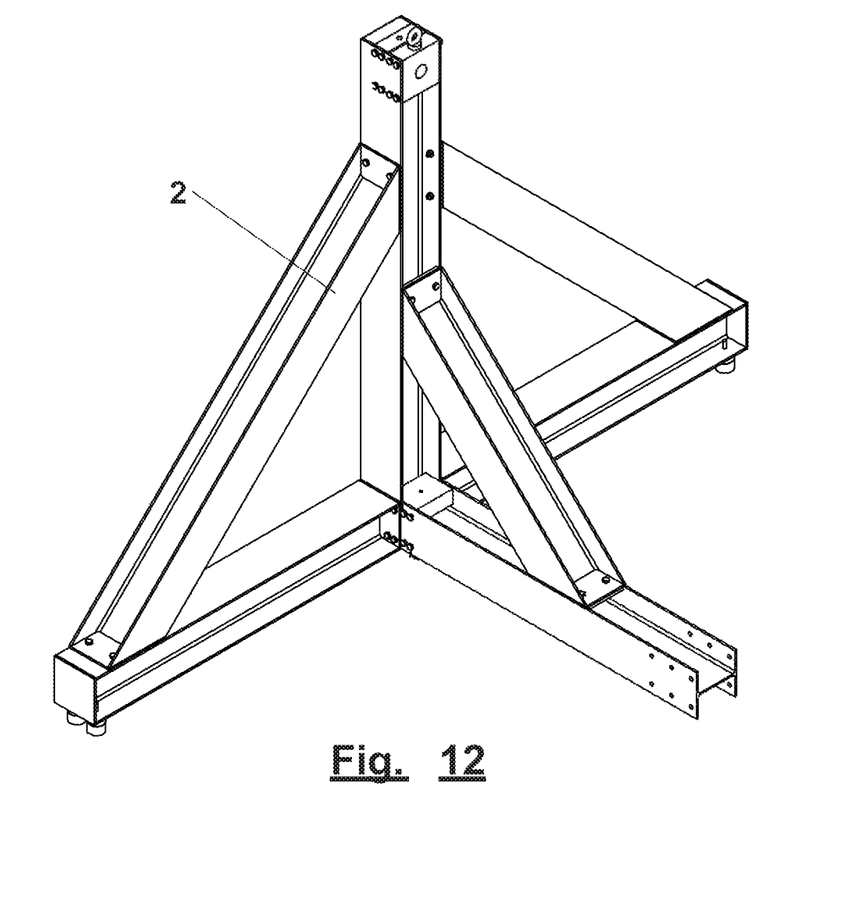
FIG. 12 is a perspective view of one side of the support base of the simulator.

FIG. 12 shows one of the support bases of the sides 2.

Figure 13:
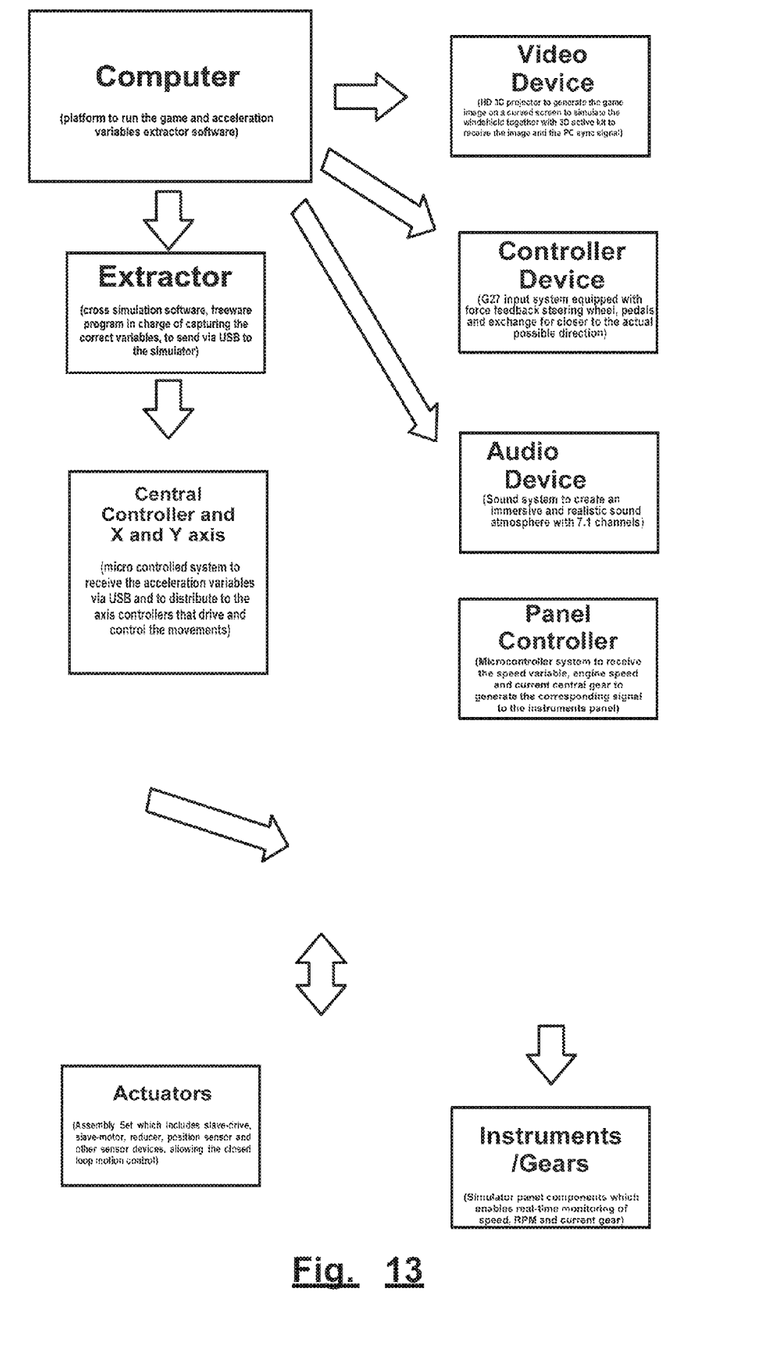
FIG. 13 is a block diagram representing the control system of the simulator.

FIG. 13 is a diagram of control blocks, which represent a computer, extractor software, a central controller 9, x and y axis controller, actuators 10, video devices, controller devices, audio device, controller of the panel, and instrument panel.

Since other modifications and changes varied to fit particular operating requirements and environments will be apparent to those skilled in the art, this invention is not considered limited to the example chosen for purposes of this disclosure, and covers all changes and modifications which does not constitute departures from the true spirit and scope of this invention.

Having thus described the invention, what is desired to be protected by Letters Patent is presented in the subsequently appended claims.

What is claimed is:

1. A virtual motion-acceleration spherical simulator comprising:
   a) an outer gyroscopic sphere;
   b) an inner gyroscopic sphere concentrically disposed relative to said outer gyroscopic sphere; and
   c) a spherical cockpit having eight quadrants, comprising:
      i) a display device,
      ii) a full HD 3D projector,
      iii) a curved screen simulating a windshield,
      iv) a controller device,
      v) a physical vehicle dashboard,
      vi) a first seat for an operator in a first quadrant of said spherical cockpit,
      vii) a second seat for a navigator in a second quadrant of said spherical cockpit,
      viii) a first drive assembly operatively connected to said outer gyroscopic sphere to impart longitudinal movement in a first direction, and
      ix) a second drive assembly operatively connected to said inner gyroscopic sphere to impart lateral movement perpendicular to said first direction.

2. The virtual motion-acceleration spherical simulator in accordance with claim 1, wherein said controller device comprises:
   iv') a force feedback steering wheel;
   iv'') pedals;
   iv''') a hand brake; and
   v'''') an audio device with a sound system to create an immersive and realistic sound atmosphere.

3. The virtual motion-acceleration spherical simulator in accordance with claim 1, wherein said physical vehicle dashboard comprises means for allowing real-time monitoring of speed, RPM, and current gear.

4. The virtual motion-acceleration spherical simulator in accordance with claim 1, further comprising motor sport bucket seats with 4-point safety buckles.

5. The virtual motion-acceleration spherical simulator in accordance with claim 1, further comprising cameras and hoods, said hoods having means to introduce and vary airflow in said spherical cockpit according to vehicle speed.

6. The virtual motion-acceleration spherical simulator in accordance with claim 1, further comprising an H-beam shaped, structural base to support said inner and outer gyroscopic spheres.

7. The virtual motion-acceleration spherical simulator in accordance with claim 1, further comprising a physical instrument dashboard and a simulator instrument dashboard that allows visualization and real-time monitoring of speed, RPM, and current gear, and wherein said physical instrument dashboard receives information representing vehicle speed, engine speed, and current gear and generates corresponding signals to said simulator instrument dashboard.

* * * * *